No. 808,497. PATENTED DEC. 26, 1905.
E. F. WHITING & G. JOHNSON.
THRESHING MACHINE.
APPLICATION FILED FEB. 28, 1905.
3 SHEETS—SHEET 2.
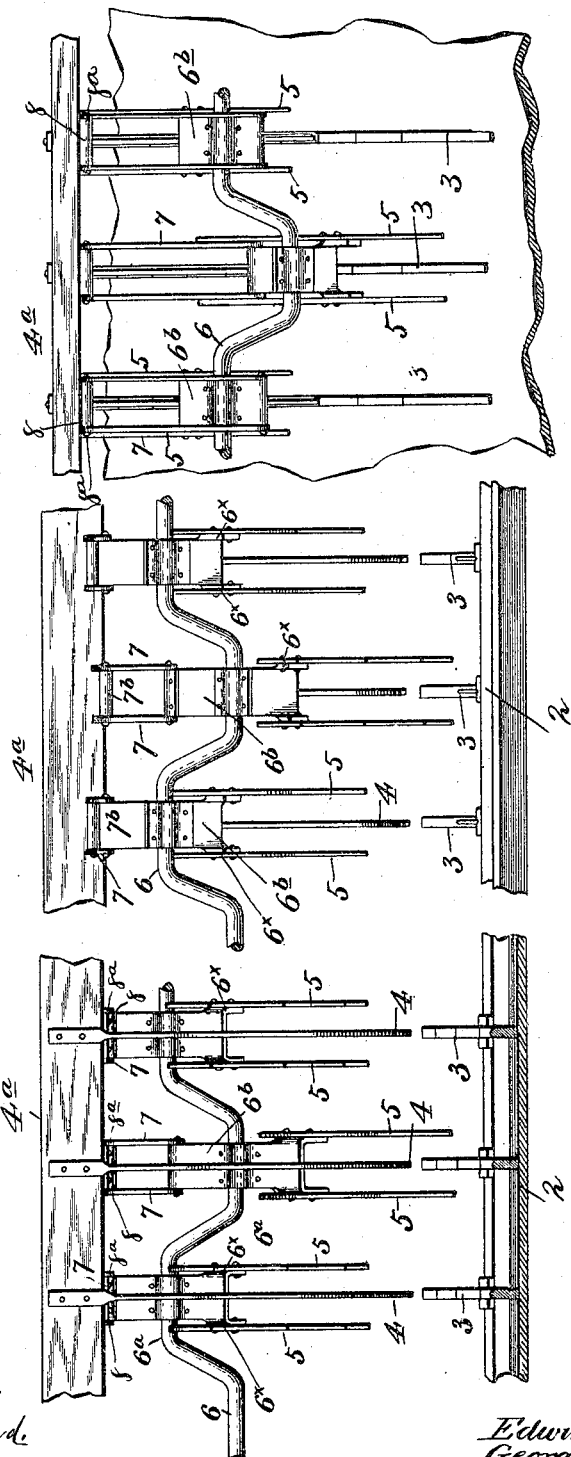

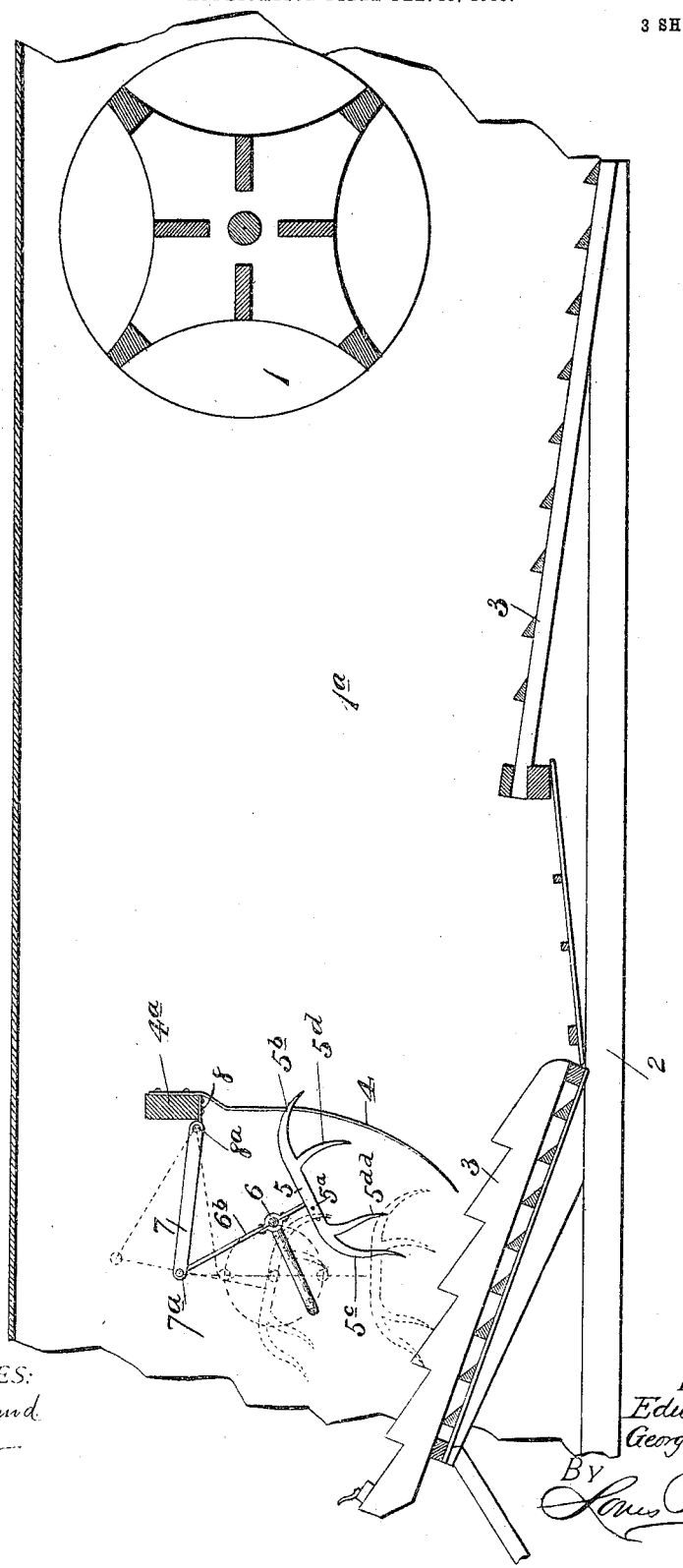

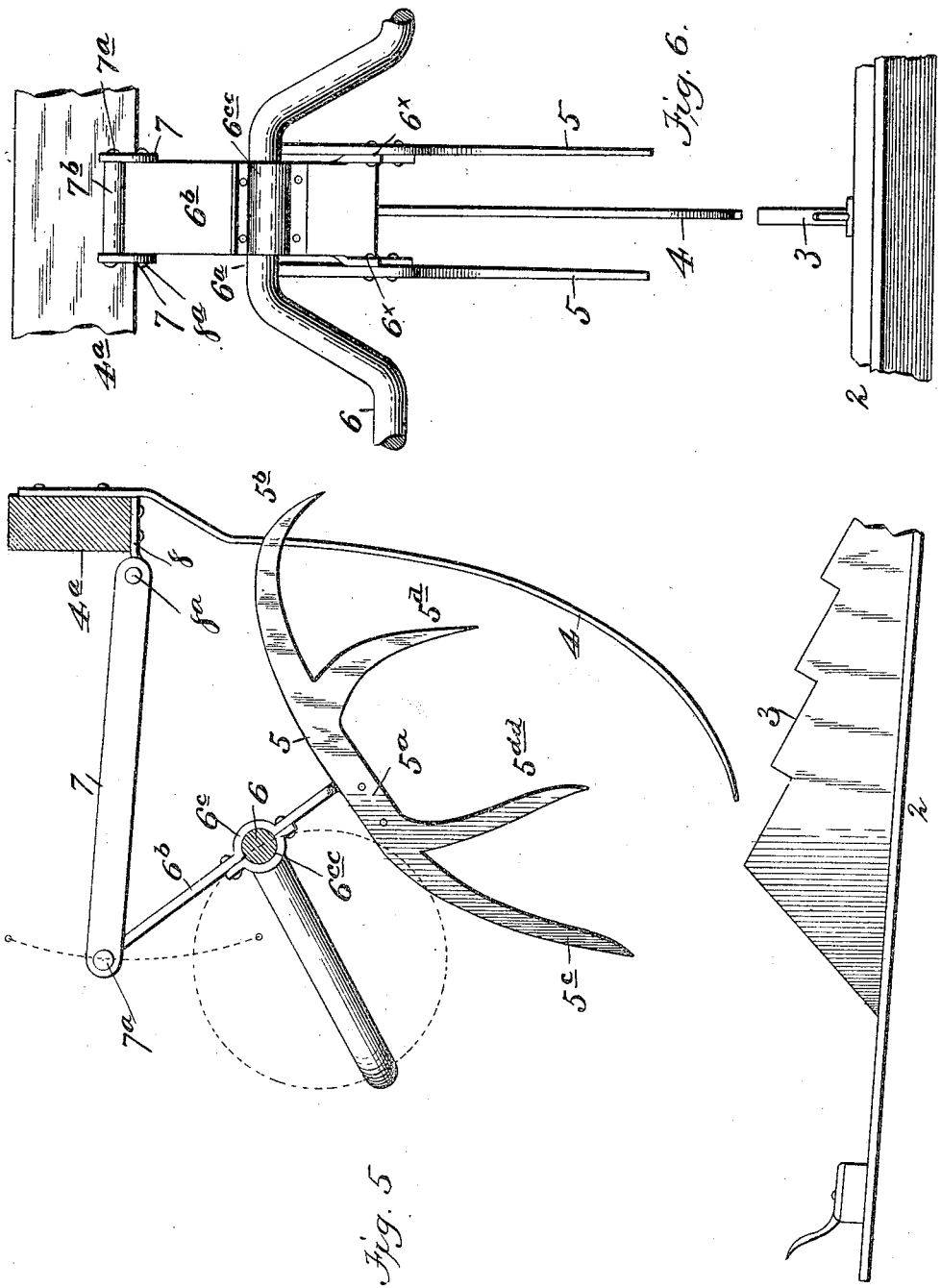

UNITED STATES PATENT OFFICE.

EDWIN F. WHITING AND GEORGE JOHNSON, OF BALATON, MINNESOTA

THRESHING-MACHINE.

No. 808,497. Specification of Letters Patent. Patented Dec. 26, 1905.

Application filed February 28, 1905. Serial No. 247,756.

*To all whom it may concern:*

Be it known that we, EDWIN F. WHITING and GEORGE JOHNSON, citizens of the United States, residing at Balaton, in the county of Lyon and State of Minnesota, have invented new and useful Improvements in Threshing-Machines, of which the following is a specification.

Our invention relates to improvements in threshing-machines.

Said invention has for its object, among other things, to provide for effectively threshing the adhering grain from the straw as the "slugs" or grain bundles are passing through the machine after having been acted upon by the beater, which latter throws or feeds said slugs to guards for the action of the pickers, and to carry out these objects in a simple and economic manner.

Said invention therefore consists of certain structural features substantially as hereinafter fully disclosed, and particularly pointed out by the claims.

In the accompanying drawings, illustrating the preferred embodiment of our invention, Figure 1 is a sectional elevation thereof. Fig. 2 is a vertical section produced transversely thereof in front of the guard-fingers. Fig. 3 is a like section taken in rear of the pickers. Fig. 4 is a plan view of the machine. Fig. 5 is an enlarged detailed view showing more especially one of the pickers and actuating crank-shaft and pitman or link connection therefor. Fig. 6 is a broken rear elevation of the parts of Fig. 5.

In the disclosure of our invention we arrange, in connection with the ordinary cylindric beater 1, straw-rack 2 with its "fish-backs" 3 of a threshing-machine, a series of suitably-spaced-apart guard-fingers 4, a series or plurality of pickers or forks 5, and a cranked shaft 6 for actuating said pickers, which will now be more fully described. Said fingers or guards 4, with their upper ends preferably secured in position, as shown, to a cross-bar $4^a$ of the usual casing or housing $1^a$, are arranged a suitable distance rearward from the beater 1 and directly above the initial fish-backs 3 of the rack 2, being preferably curved downward and rearward, with their lower ends terminating slightly beyond said fish-back.

The pickers or forks 5 are of peculiar construction, each having extending from a right-lined body portion $5^a$ a forward downward-curved tine $5^b$ and a rearward downward-inclined tine $5^c$ and having intermediately of these two tines two depending substantially right-angled tines $5^d$ $5^{dd}$, the former being slightly curved or pointing rearward and the latter just slightly inclined downward. The forward end curved tine $5^b$ reaches, when the fork or picker has arrived at the maximum or farthest point of its forward stroke, a short distance through the space between contiguous guard-fingers 4, as seen in the diagrammatic outline of Fig. 1, also in Fig. 5. Said tine $5^b$, continuing to move in an arc downward, engages in front of said guards or fingers the straw of the slug or bundle of straw, carrying or forcing the engaged portion of the latter down past the free or lower ends of said guards or fingers rearward, this downward and rearward forcing or drawing action upon the straw being, it is apparent, aided by the action of the tine $5^d$. Thus the straw is thinned out, and by having the pickers travel much faster than the straw-rack, with their fish-backs, as is herein proposed, it is obvious that this thinning-out operation will be greatly aided, whereby any grain adhering to the straw will more readily than would otherwise be the case have an opportunity to escape therefrom and drop between the racks below separated from the straw, and thus it is fair to presume be practically wholly eliminated or freed from the latter. During the upward movement of the forks or pickers the rearward-extending tines $5^c$ $5^{dd}$ will initially be presented downward toward the fish-backs and in the downward movement of the former said tines will pass down between the fish-backs, and when said forks or pickers have reached the lowest point of their movement, when the forward-end tines $5^b$ $5^d$ will be escaping the lower ends of the guards of fingers 4, the rear-end tines $5^c$ $5^{dd}$ will be lifting out from between the fish-backs. This action of the fork or picker rear-end tines will, while aiding the forcing or rearward-feeding of the straw thinned out by the action of the forward-end tines, prevent the winding or involving of the straw therewith, as would be liable to otherwise result. Said guards or fingers in thus providing for the carrying downward therebelow by the action of the forks or pickers of the straw prevent the latter from becoming wound upon or involved with the fork-actuating cranked shaft 6, as is obvious. Said shaft, suitably journaled in the sides of the casing or housing $1^a$ and suitably driven, has its alternating cranks 6$^a$, each adapted to actuate two forks or pickers 5 by an arm or bar connection 6$^b$. Said arm or connection has an arcuate deflection or seat 6$^c$ for said shaft, and to said arm is bolted or screwed a plate 6$^{cc}$, having a corresponding deflection or seat for said shaft opposite the aforesaid seat or deflection, which seats snugly embrace, but do not bind, said shaft, permitting the latter to turn therein. To one end of said arm 6$^b$ and laterally thereof are suitably applied, preferably, as shown, the two forks or pickers carried thereby, said arm having lateral extensions or flanges 6$^\times$ at said end presented sidewise and secured to said forks or pickers about at their mid-lengths, the purpose of which is apparent. Said arm or bar 6$^b$ has its opposite end suitably connected or coupled to lateral links or connections 7, arranged therebetween, and the cross-bar 4$^a$, to which they are connected to steady or aid uniformity of movement of said arms, together with the forks or pickers and their actuating-shaft. The connection between said links and said arm or bar is preferably effected by a pivot-bolt 7$^a$, passed through coincident openings of said links, and an eye-ended or sleeve terminal 7$^b$ of said arm. The connection between said links and the cross-bar 4$^a$ is similarly accomplished, a plate 8 being secured to the under side of the latter and having an eye or sleeve ended terminal, through which is passed a pivot-bolt 8$^a$, also extending through said links. The aforesaid arrangement of the cranked shaft 6, in connection with the forks or pickers, provides for the alternate engagement of the two series of pairs of forks or pickers with the straw in thinning out the latter as it is grasped or forced thereby down along the guard-fingers, which of course obviates the tendency to congestion or choking at that point which would otherwise arise, as is apparent.

These improvements, it will be understood, are applicable to any and all threshing-machines, the same being carried out substantially as above outlined.

Latitude is allowed as to details herein, as they may be changed as circumstances suggest without departing from the spirit of our invention.

We claim—

1. A threshing-machine, comprising a straw-carrier, a number of fixed guards depending suitably with relation to the latter, a series of pairs of forks, each pair being fixed to an arm, standing out at a right angle thereto, means for guiding the movement of the upper ends of the arms, and a cranked shaft having said arms loosely connected thereto, for actuating the same to cause pairs of forks to engage and carry the material along down said guards, and under and in rear thereof, for delivery upon said straw-carrier.

2. A threshing-machine, comprising a straw-carrier, a number of fixed guards having their lower ends depending contiguously to said carrier, pairs of forks, each pair being fixed laterally of an arm standing out at right angles thereto, pairs of links pivotally connected to the upper end of said arm and to fixed points, and a cranked shaft loosely connected to the arms of the pairs of forks and effective to engage and carry the material along down said guards and below and in rear thereof, to deliver said material in a thinned-out condition upon said straw-rack.

3. A threshing-machine comprising a number of spaced-apart fixed pendants or guards, pairs of forks, each pair fixed laterally of an arm or bar and to an extension of said bar, pairs of pivoted links having pivotally connected thereto and therebetween the upper end of said arm or bar, and a crank-shaft having pivotal connection with said arm or bar about at its center and journaled laterally in the machine-frame.

In testimony whereof we affix our signatures in presence of two subscribing witnesses.

EDWIN F. WHITING.
GEORGE JOHNSON.

Witnesses:
W. H. CLEAR,
A. J. RUCH.